United States Patent

[11] 3,593,628

[72] Inventor William C. Lathers
 4337 Britta Parkway, Madison, Wis. 53711
[21] Appl. No. 825,321
[22] Filed May 16, 1969
[45] Patented July 20, 1971
 Continuation-in-part of application Ser. No. 617,524, Feb. 21, 1967, now Patent No. 3,446,123, dated May 27, 1969.

[54] COMPACTING DEVICE
 4 Claims, 3 Drawing Figs.
[52] U.S. Cl. .................................................. 94/50
[51] Int. Cl. ............................................. E01c 19/26
[50] Field of Search .......................................... 94/50

[56] References Cited
UNITED STATES PATENTS
3,269,285 8/1966 Lathers ....................... 94/50

Primary Examiner—Jacob L. Nackenoff
Attorney—Wheeler, Wheeler, House and Clemency ABSTRACT: A frame has a primary shaft upon which a skeletonized cylinder is rotatable either idly by ground contact, or by power. The cylinder comprises axially spaced spoke supported discs carrying secondary shafts in annular series for orbital movement about the cylinder axis. Pairs of shafts bearing sheepsfoot rotors alternate with pairs of shafts bearing smooth rubber-tired rotors of comparable radius, all rotors being staggered to project nearly to the shafts on which neighboring rotors are mounted.

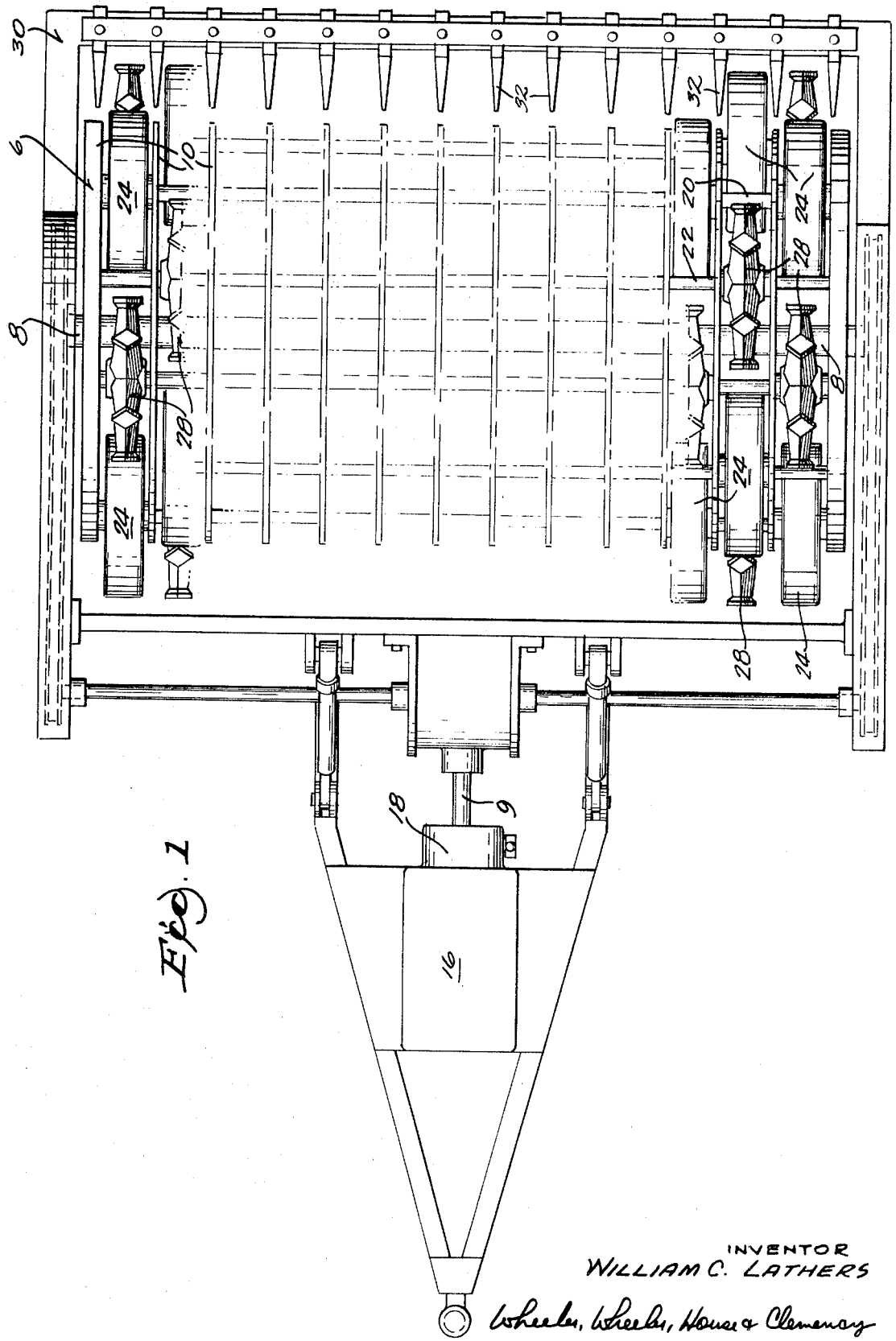

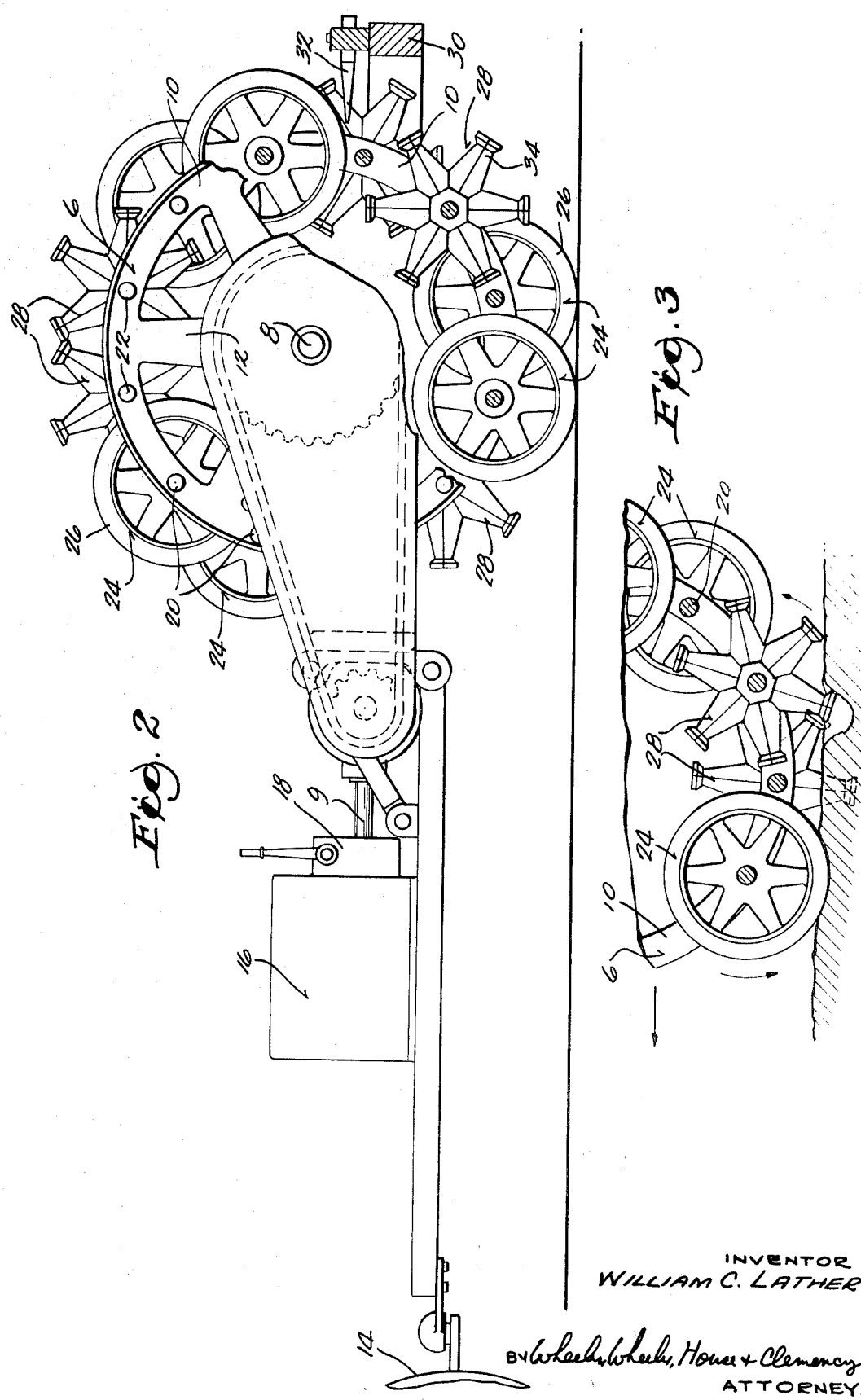

COMPACTING DEVICE

CROSS REFERENCE TO PENDING APPLICATION

This application is a continuation-in-part of my application Ser. No. 617,524 filed Feb. 21, 1967 for an Earth Compacting Device, and now U.S. Pat. No. 3,446,123 issued May 27, 1969.

BACKGROUND OF INVENTION

Smoothly peripheried rolls of the type shown in my U.S. Pat. No. 3,269,285 are valuable for some purposes. The sheepsfoot rotors of U.S. Pat. No. 3,446,123 are valuable for other purposes. The sheepsfoot rotors tend to punch deeply into the soil while the smooth surfaced rollers, usually rubber-tired, tend to smooth the compacted soil and roll it flat. In FIG. 6 of my U.S. Pat. No. 3,269,285, I tried to combine the smooth-surface rolls with the sheepsfoot rolls by placing them in alternation on the same shafts. I achieved some advantages but did not achieve the objectives of the present invention as set forth below.

SUMMARY OF INVENTION

The invention is a significant improvement upon all of my previous devices in that a rolling operation which smooths the soil is effected after each of the paired punching operations which force the sheepsfeet into the soil. The alternating punching and smoothing is very advantageous in working the soil to produce a high degree of compaction.

In addition, the instant device is the first device known to me which will permit the implement to be drawn on a paved road without damage thereto and without requiring any manipulation to change the apparatus from a status appropriate for transportation to a status appropriate for working the soil. The cylinder does not require power operation but will rotate idly whenever it encounters any substantial ground resistance. In the absence of substantial ground resistance the cylinder will not rotate. Hence its own rubber-tired rollers will roll freely without orbit to serve as wheels for transportation of the implement along a highway. The unpowered device will automatically change to orbital or nonorbital movement according to whether it encounters the low resistance of a highway or the higher resistance of unsurfaced soil. On the highway, no power should be used to rotate the main shaft and cylinder. In compacting soil elsewhere, the cylinder may be rotated by power, or may be permitted to rotate idly at the option of the operator.

BRIEF DESCRIPTION OF DRAWINGS

FIG. 1 is a fragmentary plan view of the implement.

FIG. 2 is a fragmentary side elevation thereof partly broken away and showing the implement supported from a highway surface on two of the rotor wheels.

FIG. 3 is a fragmentary detail view similar to FIG. 2 but showing the device in use for compacting unpaved ground, with two sheepsfoot rotors driven into the soil and one of the wheel rotors descending onto the soil for the rolling thereof.

DETAILED DESCRIPTION

The skeletonized cylinder 6 is generally comparable to that illustrated in my pending application Ser. No. 617,524 comprising a primary shaft 8 upon which are mounted axially spaced discs 10. Each of these discs is an annulus with spokes 12 mounting it on shaft 8 for rotation therewith. However, I preferably have 12 secondary shafts instead of 16 to give more vibration and to make the device more stable in road travel.

For power operation, the shaft 8 may be positively driven from the towing tractor 14 or it may be driven from an engine 16 mounted on the tongue which connects it with tractor 14. The clutch 18 in the driving connections permits shaft 8 to be power driven or allowed to idle. It is preferred that when the clutch 18 is engaged, the gearing connecting the prime mover with shaft 9 shall be of such ratio that the linear peripheral speed of the skeletonized cylinder 6 and the rotors thereon will be approximately five times as fast as if the cylinder were idling. This not only gives somewhat the effect of covering the ground five times instead of once, but also drives the rotors forcibly against the soil. Also it enables the prime mover 16 to assist the towing tractor in the propulsion of the device when necessary.

The discs 10 provide supports for secondary shafts 20 and 22 which are radially remote from shaft 8 and move orbitally about the axis of shaft 8, this being the axis of the skeletonized cylinder 6. Pairs of shafts 20 and pairs of shafts 22 alternate with each other as shown in FIG. 2. The shafts 20 are associated in pairs differentiated from alternating pairs of shafts 22 only in that shafts 20 carry wheels 24, usually (but not necessarily) provided with hard rubber tires 26, whereas shafts 22 carry sheepsfoot rotors 28, preferably of the type disclosed in the above identified U.S. Pat. No. 3,446,123. When the cylinder rotates, either idly or by power, both sets of rotors on the pairs of shafts 20 and 22 are constrained to orbit about the axis of the cylinder. Each rotor individually is free to rotate on its own shaft 20 or 22.

The specific manner in which the sheepsfoot rotors are constructed and the specific manner in which the several rotors are mounted on their respective shafts need not be amplified, having been disclosed in considerable detail in the pending application above identified. In general, the radius of each rotor, whether it be a wheel or a sheepsfoot rotor, is only slightly shorter than the clearance between the respective shafts 20 and 22, the rotors being staggered or interleaved. Moreover, it is preferred that the yoke 30 attached to the tongue be provided with comb teeth 32 projecting between the orbiting rotors and adapted to strip mud from the rotors as said cylinder turns. The form of the sheepsfoot legs 34 is preferably as disclosed in the above identified copending application, also to facilitate discharge of mud from between these legs.

As compared with my previous attempts to combine wheels with sheepsfoot rotors, the instant device is very much more satisfactory in that substantially the entire weight of the equipment will be shifted between a pair of wheel-type rotors and a pair of sheepsfoot-type rotors, alternately. Thus the weight punches the sheepsfoot extremities deeply into the soil but, with only a fractional turn of the cylinder, these extremities are pulled from the soil and the soil is packed flat by the smoothly peripheried wheel-type rotors.

This does a very superior job of soil preparation and packing.

If the clutch is disengaged and the cylinder is free to rotate idly on the axis of shaft 8, the implement tends to adjust itself automatically between a condition for highway travel and a condition for soil compaction. In idle operation of the cylinder, torque is derived only from the resistance offered by the ground traversed. On the highway, little or no cylinder-rotating resistance will be encountered and accordingly the cylinder will stop rotating the first time the wheels or rollers of any two paired secondary shafts 20 rest evenly upon the highway. Continued travel on the highway will occur with no damage thereto, since the implement will ride on the wheels of the paired wheel-bearing shafts and the sheepsfoot rotors will be supported free of highway contact.

However, the sheepsfoot rotors are supported in close proximity to the underlying surface. Consequently, when the implement is withdrawn from the highway onto unsurfaced ground, the feet at the extremities of the sheepsfoot rotors will strike the earth and this will cause cylinder rotation so that the sheepsfoot rotors and the wheel-type rotors will alternate in their contact with the earth for such period as this situation exists.

There are considerable advantages in relieving the operator of the necessity of throwing the clutch in or out according to the type of surface traversed. In normal usage, the driving clutch of this device need be engaged only if the ground first encountered after leaving the highway is not sufficiently rough to initiate idle rotation of the cylinder.

I claim:

1. A compacting device comprising a primary shaft, a skeletonized cylinder mounted for rotation about the axis thereof, secondary shafts mounted on the cylinder and radially spaced from the primary shaft, a pair of contiguous secondary shafts having rolling rotors thereon, an adjacent pair of secondary shafts having sheepsfoot rotors thereon, pairs of secondary shafts having rolling rotors alternating with pairs of secondary shafts having sheepsfoot rotors throughout the periphery of said cylinder.

2. A device according to claim 1 in which the several rotors are staggered and movable orbitally about the axis of the main shaft when the cylinder rotates, the smooth-surfaced rotors upon a given pair of secondary shafts being freely rotatable upon their last mentioned secondary shafts and adapted to support said device for highway travel, all of said rotors being adapted to alternate in pairs in work engagement during orbital movement with said cylinder when the device is not on the highway.

3. A device according to claim 1 in which the peripheral spacing between the secondary shafts of each pair is only slightly in excess of the radius of respective rotors carried on the last mentioned secondary shaft.

4. A device according to claim 1 including means for driving the cylinder by power, and a clutch controlling said means, whereby the cylinder may be driven and may be idled at the option of the operator.